United States Patent
Ohmi et al.

(10) Patent No.: US 6,748,751 B2
(45) Date of Patent: Jun. 15, 2004

(54) AIR COOLING DEVICE AND AIR COOLING METHOD

(75) Inventors: Tadahiro Ohmi, 1-17-301, Komegabukuro 2-chome, Aoba-ku, Sendai-shi, Miyagi-ken (JP), 980-0813; Yasuyuki Shirai, Sendai (JP); Sadao Kobayashi, 4-13-11, Hongoudai, Sakae-ku, Yokohama-shi, Kanagawa (JP), 247-0008; Isao Terada, Yokohama (JP); Toshihisa Okabe, Yokohama (JP); Takashi Taniguchi, Yokohama (JP); Naoki Mori, Tokyo (JP); Hiromu Itoh, Tokyo (JP); Yoshihide Wakayama, Tokyo (JP); Hitoshi Inaba, Tokyo (JP); Kazuo Saito, Tokyo (JP); Kikuji Kobayashi, Tokyo (JP); Hideo Hanaoka, Tokyo (JP)

(73) Assignees: Tadahiro Ohmi, Sendai (JP); Sadao Kobayashi, Yokohama (JP); Nichias Co., Ltd., Tokyo (JP); Taisei Corporation, Tokyo (JP); Hitachi Plant Engineering & Construction Co., Ltd., Tokyo (JP)

( * ) Notice: Subject to any disclaimer, the term of this patent is extended or adjusted under 35 U.S.C. 154(b) by 0 days.

(21) Appl. No.: 10/331,653

(22) Filed: Dec. 31, 2002

(65) Prior Publication Data

US 2003/0150234 A1 Aug. 14, 2003

(30) Foreign Application Priority Data

Jan. 9, 2002 (JP) .................................. 2002-002182

(51) Int. Cl.$^7$ .............................................. F28C 1/00
(52) U.S. Cl. ........................... 62/121; 62/309; 62/314; 62/411; 261/112.2
(58) Field of Search .......................... 62/305, 309, 310, 62/314, 406, 411, 414; 261/112.2

(56) References Cited

U.S. PATENT DOCUMENTS

| | | | | |
|---|---|---|---|---|
| 4,429,735 A | * | 2/1984 | Nomaguchi et al. ........... | 165/60 |
| 4,455,339 A | * | 6/1984 | Meier .......................... | 428/185 |
| 4,670,197 A | * | 6/1987 | Stackhouse ............... | 261/112.2 |
| 4,787,443 A | * | 11/1988 | Fukatsu et al. ............. | 165/165 |
| 4,905,313 A | * | 2/1990 | Stackhouse ............... | 261/112.2 |
| 5,143,658 A | * | 9/1992 | Thomas ..................... | 261/112.2 |
| 5,271,755 A | * | 12/1993 | Dietl .............................. | 65/42 |
| 5,320,651 A | * | 6/1994 | Drummond .................. | 96/356 |
| 5,775,121 A | * | 7/1998 | Kuma et al. ................. | 62/314 |
| 5,890,886 A | * | 4/1999 | Doker et al. ................ | 431/328 |
| 6,055,824 A | * | 5/2000 | Kuma et al. ................. | 62/314 |

FOREIGN PATENT DOCUMENTS

| JP | 2001-317248 | | 11/2000 |
|---|---|---|---|
| JP | 02002292224 A | * | 10/2002 |

* cited by examiner

Primary Examiner—William E. Tapolcai
Assistant Examiner—Mohammad M. Ali
(74) Attorney, Agent, or Firm—Oblon, Spivak, McClelland, Maier & Neustadt, P.C.

(57) ABSTRACT

An air cooling device includes at least one cooling unit which includes an oblique honeycomb having front, rear, upper, and lower openings and disposed so that air to be cooled is introduced into the front opening and cooled air is discharged from the rear opening, a cooling water supply means which supplies cooling water to the upper opening of the oblique honeycomb, and a water receiving section which receives discharge water discharged from the lower opening of the oblique honeycomb, and a blower means which introduces air to be cooled into the front opening of the oblique honeycomb and allows cooled air to be discharged from the rear opening of the oblique honeycomb, wherein the height of one oblique honeycomb in the cooling unit is 200 to 800 mm. The air cooling device has high thermal efficiency, a small liquid-gas ratio, and a small pressure drop, and is capable of saving space and energy.

20 Claims, 3 Drawing Sheets

AIR COOLING DEVICE AND AIR COOLING METHOD

BACKGROUND OF THE INVENTION

1. Field of the Invention

The present invention relates to an air cooling device and an air cooling method for efficiently cooling air at high temperature in summer or the like. More particularly, the present invention relates to an air cooling device for cooling air in office buildings, hospitals, and factories, and an air cooling method using the same.

2. Description of Background Art

Energy used for air conditioning in office buildings, factories, and the like accounts for 30% or more of the energy consumed in Japan. Therefore, reduction of energy consumption used for air conditioning has become a pressing issue. Conventionally, circulating air or intake air in office buildings or factories is supplied to a fin coil-type heat exchanger in which a refrigerant or cooling water is circulated, and cooled when passing through the fin coil. However, in the case of using the fin coil-type heat exchanger, a large amount of cooling water is necessary in comparison with the amount of air to be cooled (liquid-gas ratio is high). Therefore, a large amount of electric power is needed to operate a pump for circulating cooling water and the like. Moreover, the fin coil-type heat exchanger has a large pressure drop. Furthermore, water drops adhering to the fin coil has a considerable effect on thermal conduction, whereby thermal efficiency is significantly decreased. As a method for removing water drops adhering to the fin coil, a method of blowing off the water drops by using a blower or the like has been proposed. However, since space for installing the blower or the like and additional electric power are necessary, it is not desirable to use this method from the viewpoint of space efficiency and power saving.

In order to overcome the above problems, a method of allowing water to come directly into contact with air by using an oblique honeycomb instead of the fin coil has been proposed. For example, Japanese Patent Application Laid-open No. 2000-317248 discloses a method of removing NOx and the like contained in air by serially connecting wetted-wall columns in which water flows along the wall and allowing air to pass through the wetted-wall columns. However, in the case of using this method as an air cooling method, since water warmed when flowing through the wetted-wall column is allowed to flow through the next wetted-wall column, the air cannot be sufficiently cooled. Moreover, since it is necessary to provide pumps for supplying water to each column, installation and operation costs for the pumps are necessary.

As another method of allowing water to come directly into contact with air by using the oblique honeycomb instead of the fin coil, a method of cooling warm or hot water with air by using an oblique honeycomb made of conventional polyvinyl chloride as a cooling tower is known. However, since the oblique honeycomb is made of conventional polyvinyl chloride, warm water or the like is repelled from the surface of the oblique honeycomb and falls in the shape of water drops. Specifically, since the surface of the oblique honeycomb is not uniformly wetted by warm water or the like, the large surface area of the oblique honeycomb cannot be fully utilized. This results in thermal efficiency lower than that of the fin coil-type cooling device. Therefore, the oblique honeycomb cannot be used as an air cooling device having high thermal efficiency.

Accordingly, an object of the present invention is to provide an air cooling device excelling in thermal efficiency, having a small liquid-gas ratio and a small pressure drop, and capable of saving space and energy and reducing cost, and an air cooling method using the same.

SUMMARY OF THE INVENTION

In view of the above situation, the present inventor has conducted extensive studies and found that an air cooling device having high thermal efficiency, a small liquid-gas ratio, and a small pressure drop, and saving space and energy can be realized by using at least one cooling unit which includes an oblique honeycomb, a cooling water supply device, and a water receiving section, and limiting the height of one oblique honeycomb in the cooling unit within a specific range. This finding has led to the completion of the present invention.

Specifically, the present invention provides an air cooling device comprising at least one cooling unit which comprises an oblique honeycomb which has front, rear, upper, and lower openings and is disposed so that air to be cooled is introduced into the front opening and cooled air is discharged from the rear opening, a cooling water supply means which supplies cooling water to the upper opening of the oblique honeycomb, and a water receiving section which receives discharge water discharged from the lower opening of the oblique honeycomb, and a blower means which introduces air to be cooled into the front opening of the oblique honeycomb and allows cooled air to be discharged from the rear opening of the oblique honeycomb, wherein the height of one oblique honeycomb in the cooling unit is 200 to 800 mm.

The present invention also provides an air cooling method using the above air cooling device, comprising introducing air to be cooled into the front opening of the oblique honeycomb of the cooling unit, and allowing cooled air to be discharged from the rear opening of the oblique honeycomb.

BRIEF DESCRIPTION OF THE DRAWINGS

In FIGS. 1 to 3, 1 indicates an air cooling device, 2 indicates a water dispersion device (cooling water supply means), 3 indicates an oblique honeycomb, 4 indicates a water receiving pan (water receiving section), 5, $5a_1$, $5a_2$, $5a_3$, $5b_1$, $5b_2$, $5b_3$, $5c_1$, $5c_2$, $5c_3$, $5d_1$, $5d_2$, and $5d_3$ indicate cooling units, 6 indicates a circulating pump (water circulating means), 7 indicates a heat exchanger, 8 indicates cooling water for cooling discharge water, 9 indicates an arrow indicating the direction in which air flows, 10 indicates a water pipe, 11 indicates an arrow indicating supply water, 12 indicates cooling water, 13 indicates discharge water, 14 indicates a case, 15 indicates a discharge pipe, 21 and 22 indicate corrugated sheets adjacent to each other, 23 indicates a water supply conduit, 101 indicates an upper opening of the oblique honeycomb, 102 indicates a rear opening of the oblique honeycomb, 103 indicates a front opening of the oblique honeycomb, 104 indicates a lower opening of the oblique honeycomb, 111, 112, and 113 indicate branched water pipes, and 151, 152 and 153 indicate branched discharge pipes.

DETAILED DESCRIPTION OF THE INVENTION AND PREFERRED EMBODIMENT

Figure 1:
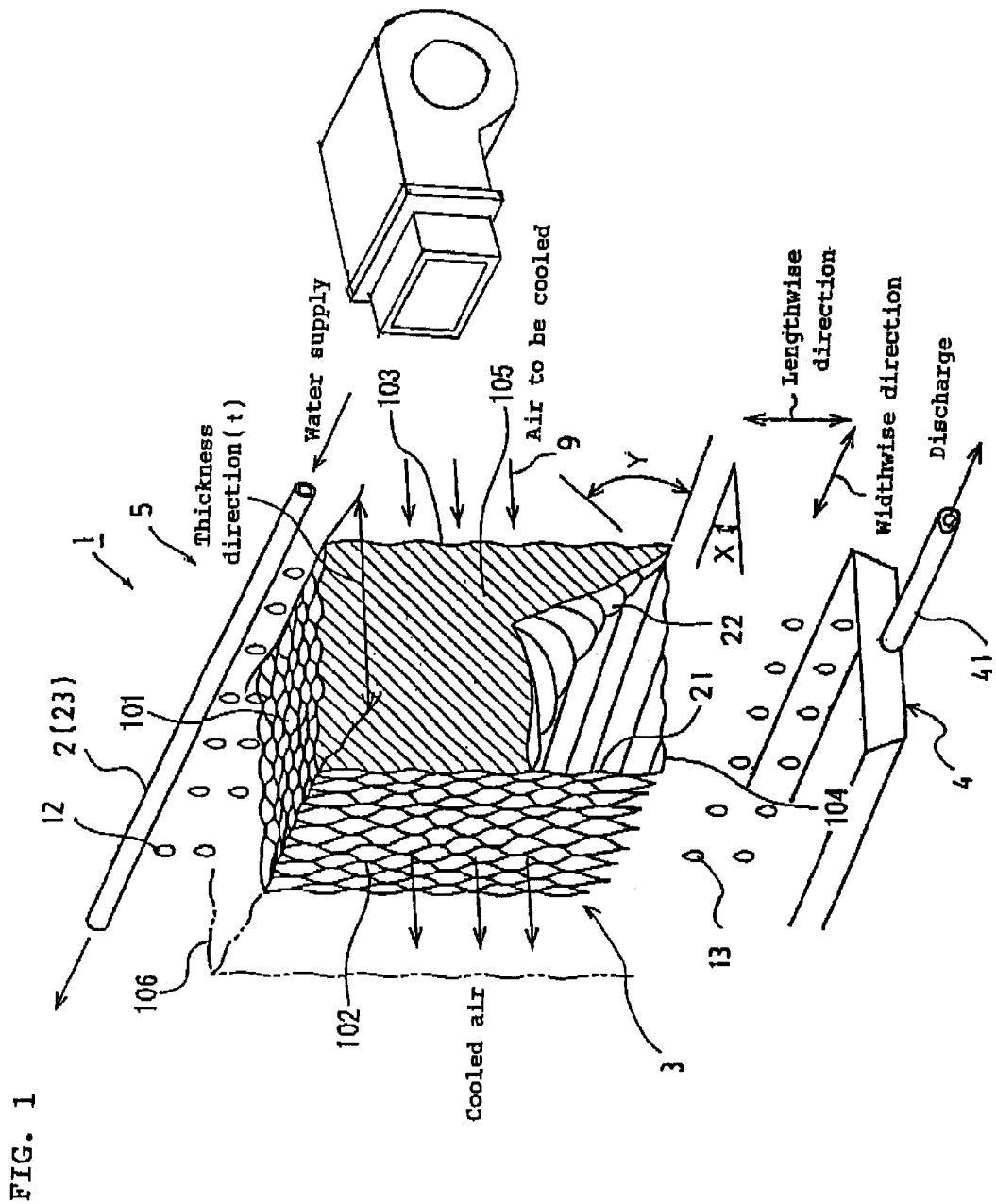
FIG. 1 is a schematic cross-sectional diagram showing a part of an air cooling device in a first embodiment.

An air cooling device in a first embodiment of the present invention is described below with reference to FIG. 1. FIG. 1 is a schematic cross-sectional diagram showing a part of an air cooling device in this example. In FIG. 1, 1 indicates an air cooling device, 2 indicates a water dispersion device (cooling water supply means), 3 indicates an oblique honeycomb, 4 indicates a water receiving pan (water receiving section), and 5 indicates a cooling unit. The air cooling device 1 in this example includes the cooling unit 5 which includes the water dispersion device 2, the oblique honeycomb 3, and the water receiving pan 4, and a blower means (not shown).

The oblique honeycomb 3 used in the cooling unit 5 is in the shape of a honeycomb in which a plurality of wave-shaped sheets 21 and 22 in the shape of a wave spreading in one direction (hereinafter may be referred to as "corrugated sheets") are layered. The corrugated sheets 21 and 22 are layered so that directions in which the wave spreads intersect obliquely in every other sheet. The corrugated sheets 21 and 22 are disposed so that the directions in which the wave spreads are almost the same in every two sheets.

If the oblique honeycomb 3 is cut at four sides 101 to 104 perpendicular to the side parallel to the corrugated sheets 21 and 22, a rectangular parallelepiped in which the four sides 101 to 104 are neither parallel nor perpendicular to the direction in which the wave of the corrugated sheet spreads is formed. In the case where the rectangular parallelepiped is placed so that the side 104 is positioned at the bottom and outermost layers 105 and 106 of the corrugated sheets are positioned at the right and left sides, the oblique honeycomb 3 has a structure in which the honeycomb cells are opened at the front and back sides 102 and 103 and the upper and lower sides 101 and 104, and the right and left sides 105 and 106 are closed by the corrugated sheets. Specifically, the oblique honeycomb 3 has a structure in which the front and back sides 102 and 103 and the upper and lower sides 101 and 104 are opened. Cells extending in the upward oblique direction and cells extending in the downward oblique direction are formed in every other layer on the front and back sides 102 and 103, for example. An oblique angle with respect to the inflow/outflow direction of air (horizontal direction) when viewed from the front and back sides of the cells extending in the oblique direction (angle indicated by a symbol X shown in FIG. 1) is usually 15 to 45 degrees, and preferably 25 to 35 degrees. If the oblique angle is within this range, contact efficiency is improved due to a moderate flow rate.

In the oblique honeycomb 3, an angle at which the directions in which the waves of the layered corrugated sheets spread intersect in every other layer (angle indicated by a symbol Y shown in FIG. 1) is usually 30 to 90 degrees, and preferably 50 to 70 degrees. If the corrugated sheets are layered so that the directions in which the wave spreads intersect at within the above angle, an area in which the air to be cooled and water substantially come in contact with the honeycomb cell is increased when setting the oblique angle (X) at 15 to 45 degrees, whereby contact between the air to be cooled and water, specifically, cooling efficiency of the air to be cooled is increased. Specifically, in the present invention, the air to be cooled is introduced into the front opening 103 of the oblique honeycomb 3. Water is supplied to the upper opening 101 by the cooling water supply means 2 such as the water supply conduit 23, permeates the corrugated sheets of the oblique honeycomb, and slowly flows down along the surface of the corrugated sheet. Therefore, the direction in which the air to be cooled passes and the direction in which the water permeates and flows down along the wall are maintained at a moderate angle, whereby contact efficiency is increased.

The height of the cell of the oblique honeycomb used in the present invention, specifically, the wave height of the cell between the crest and the trough of the wave is usually 2.5 to 8.0 mm, and preferably 3 to 5 mm. If the wave height of the cell is less than 2.5 mm, it is difficult to manufacture the oblique honeycomb. Moreover, the pressure drop is increased. If the wave height of the cell exceeds 8.0 mm, cooling efficiency is decreased.

The width of the cell of the oblique honeycomb in a state of a corrugated sheet, specifically, the cell pitch is usually 6 to 16 mm, and preferably 7 to 10 mm. The length between the front opening and the rear opening of the oblique honeycomb, specifically, the thickness (t) of the oblique honeycomb is usually 100 to 1000 mm, and preferably 200 to 800 mm. If the thickness is less than 100 mm, cooling efficiency is decreased. If the thickness exceeds 1000 mm, not only cooling efficiency is not further improved, but also pressure drop is increased. In the present invention, in the case of using a plurality of oblique honeycombs, the thickness of the oblique honeycombs is determined so that the total thickness of the oblique honeycombs is within the above range. For example, in the case of using an oblique honeycomb with a thickness of 300 mm, three pieces of oblique honeycombs with a thickness of 100 mm may be layered in the direction of the thickness so that the total thickness is 300 mm. If the oblique honeycomb is used as the cooling means, since the heat exchange rate per volume is higher than that of a conventional fin coil, the thickness of the oblique honeycomb can be decreased, whereby space for installing the device can be decreased. Moreover, the amount of circulating water is remarkably decreased in comparison with a conventional fin coil, whereby energy consumption can be significantly decreased.

The sheet-shaped member which makes up the oblique honeycomb preferably has an uneven surface and is porous inside thereof. This increases the surface area of the element, whereby the contact area between air and water which permeates and flows down the element is increased. As examples of such a sheet-shaped member, a sheet-shaped member containing one or more fillers and/or binders selected from the group consisting of alumina, silica, and titania, and a fiber substrate such as glass fiber, ceramic fiber, or alumina fiber can be given. Of these, use of a sheet-shaped member containing titania is preferable because removal efficiency of acidic chemical pollutants is improved. The sheet-shaped member usually contains 60 to 93 wt % of filler or binder and 7 to 40 wt % of fiber substrate. The sheet-shaped member preferably contains 70 to 88 wt % of filler or binder and 12 to 30 wt % of fiber substrate. If the ratio of the components of the sheet-shaped member is within the above range, water permeability and the strength of the sheet-shaped member are increased.

The sheet-shaped member may be manufactured by using a conventional method. For example, the sheet-shaped member may be obtained by immersing paper made of glass fiber, ceramic fiber, or alumina fiber in slurry in which a binder such as alumina sol is mixed with a filler such as alumina hydrate, drying the mixture, corrugating the dried product, and removing water and organic components from the corrugated product by drying and heating. In the case where the sheet-shaped member contains silica and titania in addition to alumina, the amount of each of silica and titania to be added is usually 5 to 40 parts by weight for 100 parts by weight of alumina.

The thickness of the sheet-shaped member of the oblique honeycomb is usually 200 to 1000 $\mu$m, and preferably 300 to 800 $\mu$m. The porosity of the oblique honeycomb is usually 50 to 80%, and preferably 60 to 75%. If the porosity is within the above range, moderate permeability can be realized, whereby contact efficiency between air and water can be increased. If the sheet-shaped member has the above thickness and porosity, the liquid-gas ratio and water permeation rate are within a moderate range, whereby contact efficiency between water and air is increased, and the strength is sufficient.

The height of the oblique honeycomb 3 is 200 to 800 mm, and preferably 400 to 600 mm. If the height is less than 200 mm, the temperature of the cooling water which flows down and reaches the bottom of the oblique honeycomb remains low. This means that the cooling water is discharged without being effectively utilized as the cooling water. If the height exceeds 800 mm, the difference in temperature between the cooling water which reaches the bottom of the oblique honeycomb and the air to be cooled is decreased, whereby heat exchange efficiency at the bottom of the oblique honeycomb is decreased.

As a method of forming the sheet-shaped member into a corrugated sheet, a method using a conventional corrugator in which a planar sheet is allowed to pass between a plurality of wide gears on which wave-shaped unevenness is formed on the surface in the direction of the diameter can be given. The oblique honeycomb is formed by using the corrugated sheet as described below, for example. Specifically, the corrugated sheet is placed on a rectangular cutting die with a length of about 100 mm (thickness after forming the oblique honeycomb) and a width of 800 mm (width or height after forming the oblique honeycomb) so that the direction in which the wave spreads is at an angle of 15 to 45 degrees with respect to one side of the rectangular die and then cut to form rectangular corrugated sheets. The resulting rectangular corrugated sheets are disposed so that the directions in which the wave spreads intersect obliquely in every other sheet, and layered and caused to adhere to each other. In the case of forming the oblique honeycomb in this manner, the thickness of one oblique honeycomb is equal to the length of the cutting die. In the case where the thickness of the oblique honeycomb incorporated into one cooling unit, specifically, the length between the front opening and the rear opening of the oblique honeycomb must be 300 mm, when using the oblique honeycomb with a thickness of 100 mm formed by using a cutting die with a length of 100 mm, three sheets of oblique honeycombs with a thickness of 100 mm are layered in the direction of the thickness. In the case where the height or width of one oblique honeycomb is insufficient, a plurality of oblique honeycombs may be layered in the direction of the height or arranged in the direction of the width. In the case of layering or arranging a plurality of oblique honeycombs, the oblique honeycombs may be or may not be caused to adhere to each other. In the case where the oblique honeycombs are not caused to adhere to each other, it suffices that a plurality of oblique honeycombs be merely layered or arranged.

The cooling water supply means 2 used in the cooling unit 5 supplies the cooling water to the upper opening of the oblique honeycomb 3. There are no specific limitations to the form of the cooling water supply means 2. As examples of the cooling water supply means 2, a conventional water supply conduit 23 shown in FIG. 1 which merely drips water drops, a means in which a spray nozzle is attached to a water pipe so that water is provided to the upper opening of the oblique honeycomb (not shown) in a dispersed state, and the like can be given. It is preferable that the amount of water from the cooling water supply means 2 be adjustable so that the necessary amount of cooling water is supplied to the oblique honeycomb 3.

The water receiving section 4 used in the cooling unit 5 receives water discharged from the lower opening 104 of the oblique honeycomb 3. There are no specific limitations to the form of the water receiving section 4. As examples of the water receiving section 4, the water receiving pan in the shape of a gutter shown in FIG. 1 and the like can be given. A discharge pipe 41 which discharges water toward outside of the water receiving section 4 may be provided to the water receiving section 4. The cooling unit 5 is usually incorporated into a framework (not shown) and secured therein. In this case, it is preferable to form a small gap between the water supply conduit 23 and the upper opening 101 of the oblique honeycomb, since water can be uniformly dispersed over the entire upper opening 101 of the oblique honeycomb. It is preferable to dispose the lower opening 104 of the oblique honeycomb and the water receiving section 4 as close as possible in order to save space.

The air cooling device 1 further includes a blower means which introduces the air to be cooled into the front opening 103 of the oblique honeycomb 3 and allows cooled air to be discharged from the rear opening 102 of the oblique honeycomb 3. As examples of the blower means, a blower including a fan and the like can be given. It is preferable to provide a cooling means (not shown) which cools the discharge water and a water circulating means (not shown) which supplies the discharge water to the cooling water supply means 2 to the air cooling device 1. This enables the cooling water (discharge water) which flows down through the oblique honeycomb 3 and is warmed by the air to be cooled to be reutilized. As examples of the cooling means, a heat exchanger and the like can be given. As examples of the water circulating means, a circulating pump and the like can be given.

A method of using the air cooling device in the first embodiment is described below with reference to FIG. 1. The cooling water 12 is supplied dropwise to the upper opening 101 of the oblique honeycomb 3 from the cooling water supply means 2. At this time, the entire oblique honeycomb 3 is wetted by appropriately adjusting the amount of water supply of the cooling water 12. The air to be cooled is introduced into the front opening 103 of the oblique honeycomb 3 in the direction indicated by an arrow 9 shown in FIG. 1 by using the blower means (not shown) or the like. In the cells inside the oblique honeycomb 3, the cooling water 12 comes directly into contact with the air to be cooled, whereby the air is cooled. In the case where chemical pollutants and the like are present in the air to be cooled, such chemical pollutants and the like are captured in the cooling water 12. The cooling water 12 which is warmed by heat exchanging and in which the chemical pollutants are optionally captured becomes the discharge water 13 when completely flowing down through the oblique honeycomb 3, and is then transferred to the water receiving section 4. The discharge water 13 in the water receiving section 4 is supplied to the heat exchanger by means of a circulating pump (not shown) through a discharge pipe 41, and cooled to a predetermined temperature. The cooled discharge water 13 is supplied to the cooling water supply means 2 and reutilized as the cooling water 12. The cooled air is obtained from the rear opening 102 of the oblique honeycomb 3.

In the air cooling method using the air cooling device according to the first embodiment, the cooling unit including the oblique honeycomb in which the air to be cooled comes directly into contact with the cooling water is used, and the height of the oblique honeycomb is set within a specific range. Therefore, the cooling water can be used in a cooled state, whereby thermal efficiency is increased and the liquid-gas ratio and the pressure drop are decreased. Moreover, saving of space and energy and reduction of cost can be achieved.

In the air cooling device of the present invention, a plurality of cooling units 5 may be used. In this case, as examples of the arrangement of the cooling units 5, an arrangement in which a plurality of the cooling units 5 are disposed in the vertical direction of the oblique honeycomb 3 (multi-stage arrangement), an arrangement in which a plurality of the cooling units 5 are disposed in the direction in which the air to be cooled flows (multi-row arrangement), an arrangement in which a plurality of the cooling units 5 are disposed in the direction of the width of the oblique honeycomb 3, an arrangement in which two or more of these arrangements are used in combination, and the like can be given. The vertical direction of the oblique honeycomb 3 refers to the direction which connects the upper opening of the oblique honeycomb 3 with the lower opening. The direction in which the air to be cooled flows refers to the direction which connects the front opening of the oblique honeycomb 3 with the rear opening. The direction of the width of the oblique honeycomb 3 refers to the direction which intersects the vertical direction and the direction in which the air to be cooled flows almost at right angles.

Figure 2:
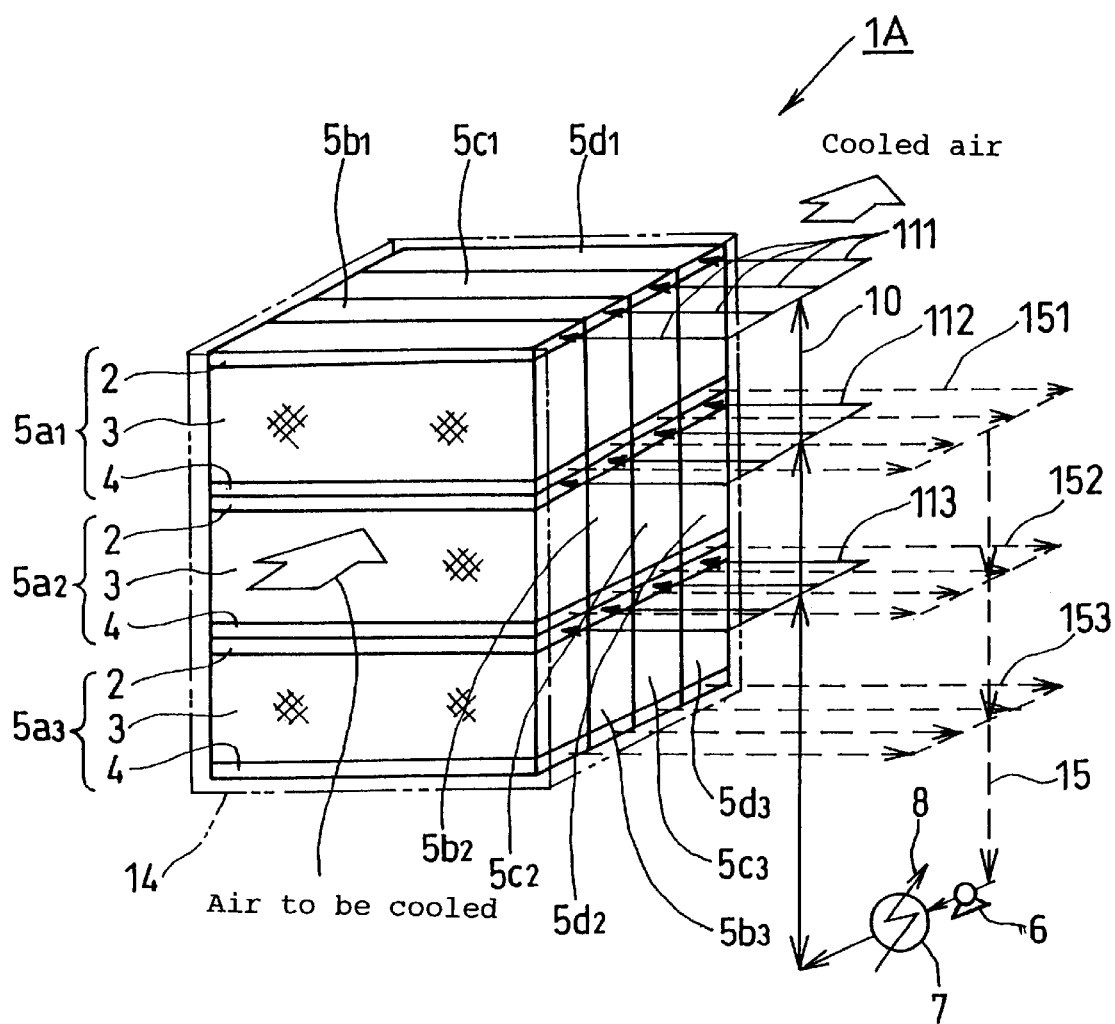
FIG. 2 is a schematic diagram showing an air cooling device in a second embodiment.
Figure 3:
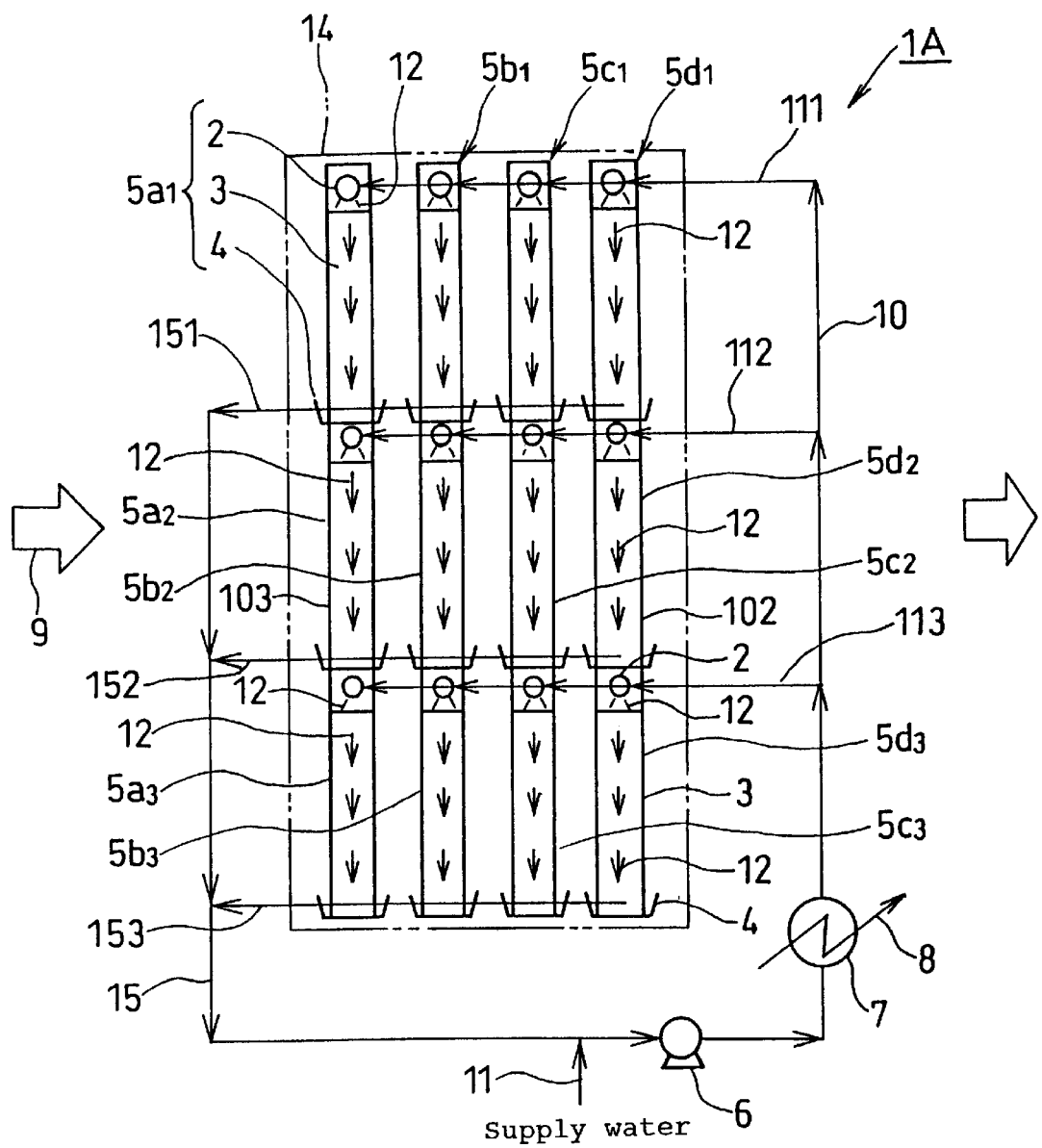
FIG. 3 is a schematic diagram showing the air cooling device in the second embodiment viewed from the side which intersects the direction in which air to be cooled flows.

An air cooling device in which a plurality of cooling units 5 are used is described below as a second embodiment with reference to FIGS. 2 and 3. FIG. 2 is a schematic diagram showing an air cooling device in this example. FIG. 3 is a schematic diagram showing the air cooling device in this example viewed from the side which intersects the direction in which the air to be cooled flows at right angles. In FIG. 3, gaps are formed between the oblique honeycombs adjacent in the direction in which the air to be cooled flows. This aims at making the drawing readily understood. In the actual situation, the rear opening 102 of the oblique honeycomb in front is in contact with or close to the front opening 103 of the oblique honeycomb at the back.

In the air cooling device in the second embodiment shown in FIGS. 2 and 3, constituent elements the same as those shown in FIG. 1 are indicated by the same symbols, and description of these elements is omitted. Different features are mainly described below. In FIGS. 2 and 3, features differing from the air cooling device shown in FIG. 1 are that 12 pieces of the cooling units 5 are disposed in three stages in the vertical direction and in four rows in the direction in which the air to be cooled flows, and a cooling water system and a discharge water system make up a circulating system. Specifically, in an air cooling device 1A in the second embodiment, cooling units $5a_1, 5a_2$, and $5a_3$ are disposed in that order from the top in the vertical direction in a first row in the direction in which the air to be cooled flows. Cooling units $5b_1, 5b_2$, and $5b_3$ are disposed in that order from the top in the vertical direction in a second row in the same direction. Cooling units $5c_1, 5c_2$, and $5c_3$ are disposed in that order from the top in the vertical direction in a third row in the same direction. Cooling units $5d_1, 5d_2$, and $5d_3$ are disposed in that order from the top in the vertical direction in a fourth row in the same direction. A water circulating system includes a water circulating means 6 which supplies water discharged from the water receiving section 4 through a discharge pipe 15 to the cooling water supply means 2 through a water pipe 10, and a cooling means 7 which cools the discharge water.

Branched water pipes 111, 112, and 113, which are branched from the water pipe 10 and collectively supply water to each stage, are respectively connected with the cooling water supply means 2, 2, 2, 2 of the cooling units $5a_1, 5b_1, 5c_1$, and $5d_1$ in the upper stage, the cooling water supply means 2, 2, 2, 2 of the cooling units $5a_2, 5b_2, 5c_2$, and $5d_2$ in the middle stage, and the cooling water supply means 2, 2, 2, 2 of the cooling units $5a_3, 5b_3, 5c_3$, and $5d_3$ in the lower stage. The water receiving sections 4, 4, 4, 4 of the cooling units $5a_1, 5b_1, 5c_1$, and $5d_1$ in the upper stage are connected with one another. The water receiving sections 4, 4, 4, 4 of the cooling units $5a_2, 5b_2, 5c_2$, and $5d_2$ in the middle stage are connected with one another. The water receiving sections 4, 4, 4, 4 of the cooling units $5a_3, 5b_3, 5c_3$, and $5d_3$ in the lower stage are connected with one another. Branched water pipes 151, 152, and 153, which are branched from the water discharge pipe 15 are respectively connected with the water receiving sections 4, 4, 4, 4 of the cooling units $5a_1, 5b_1, 5c_1$, and $5d_1$ in the upper stage, the water receiving sections 4, 4, 4, 4 of the cooling units $5a_2, 5b_2, 5c_2$, and $5d_2$ in the middle stage, and the water receiving sections 4, 4, 4, 4 of the cooling units $5a_3, 5b_3, 5c_3$, and $5d_3$ in the lower stage. Discharge water is collected by the water receiving sections 4 in each stage.

In each of the cooling units 5, a plurality of oblique honeycombs 3 may be disposed in the widthwise direction. Specifically, the oblique honeycomb 3 may have a form in which divided oblique honeycombs are arranged in the widthwise direction. There are no specific limitations to the form of installing each cooling unit 5 in the air cooling device 1A. For example, a method of layering the cooling units 5 in the first embodiment in the vertical direction, arranging the layered cooling units 5 in the front and back direction, and securing the cooling units 5 on a framework can be given. In this case, it is preferable that the width of the water receiving section 4 in the front and back direction be almost the same as the thickness of the oblique honeycomb 3, and the cooling units 5 be arranged and secured in the front and back direction so that the rear opening 102 of the oblique honeycomb in front is in contact with or close to the front opening 103 of the oblique honeycomb at the back from the viewpoint of space saving.

The air cooling device 1A may dispose the discharge water 13 in the water receiving section 4 without providing a circulating pump and a heat exchanger differing from the first embodiment. A water purifying device which removes impurities from the cooling water may be incorporated into the air cooling device 1A. It is preferable to place the cooling units 5 in a case 14 shown in FIGS. 2 and 3, of which the right and left sides and the upper and lower sides form walls so that the air to be cooled passes through only the front opening of the oblique honeycomb 3. There are no specific limitations to the form of the case 14. If gaps are not (substantially) formed between the cooling units 5 and the case 14, thermal efficiency is increased. It is preferable to connect an outlet port of the blower with the front opening of the case 14 by using a conduit, and supply the air to be cooled through the conduit. This increases blowing efficiency.

A method of cooling air by using the air cooling device in the second embodiment is described below with reference to FIGS. 2 and 3. The cooling water 12 is allowed to flow down into the upper openings 101 of the oblique honeycombs 3 (four each in upper stage, middle stage, and lower stage) at the same time. At this time, the entire 12 pieces of oblique honeycombs 3 are wetted by appropriately adjusting the amount of water supply and a sprinkling method of the cooling water 12. The air to be cooled is introduced into the front openings 103 of the three oblique honeycombs 3 in front in the direction indicated by the arrow 9 shown in FIG. 2 by using the blower means (not shown) or the like. In the cells inside the 12 pieces of oblique honeycombs 3, the cooling water 12 comes directly into contact with the air to be cooled, whereby the air is cooled. In the case where chemical pollutants and the like are present in the air to be cooled, such chemical pollutants and the like are captured in the cooling water 12. The cooling water 12 which is warmed by heat exchanging and in which the chemical pollutants are optionally captured becomes the discharge water 13 when completely flowing down through each oblique honeycomb 3, and transferred to the water receiving section 4. The discharge water 13 in the water receiving section 4 is supplied to the heat exchanger 7 by means of the circulating pump 6 through the branched discharge pipes 151, 152, and 153 and the discharge pipe 15, and cooled to a predetermined temperature. The cooled discharge water 13 is supplied to the cooling water supply means 2 and reutilized as the cooling water 12. The cooled air is obtained from the rear openings 102 of the oblique honeycombs $5d_1$, $5d_2$, and $5d_3$ in the rearmost row.

According to the air cooling device in the second embodiment, effects the same as those of the air cooling device in the first embodiment are obtained. Moreover, since the height of one oblique honeycomb is decreased by providing the cooling units in a plurality of stages in the vertical direction, the temperature of the cooling water remains low at the bottom of the oblique honeycomb, whereby thermal efficiency is improved. Furthermore, the flow rate of the air to be cooled can be increased by providing the cooling units in a plurality of rows in the direction in which the air to be cooled flows. Therefore, space and energy saving can be achieved.

In the present invention, there are no specific limitations to the air to be cooled. As the air to be cooled, air containing minute chemical pollutants which pass through a high performance (ULPA) filter may be used as well as clean air. As examples of chemical pollutants, metal elements such as sodium, potassium, calcium, and boron, anions such as a fluorine ion, chloride ion, nitrate ion, nitrite ion, sulfate ion, and sulfite ion, cations such as an ammonium ion, and the like can be given.

In the air cooling device according to the present invention, since the air to be cooled comes directly into contact with the cooling water, chemical pollutants are captured in the cooling water, whereby clean cooled air can be obtained. In the case where a large amount of chemical pollutants is present in the air to be cooled, the cooling water can be maintained clean by optionally disposing a water purifying device into which an ion-exchange resin and the like are incorporated between the water receiving section 4 and the cooling water supply means 2 as a means for removing the chemical pollutants from the discharge water.

There are no specific limitations to the temperature of air to be cooled. For example, the temperature of the air to be cooled is 20° C. or more, preferably 25° C. or more, and still more preferably 30° C. or more. Thermal efficiency is generally improved as the temperature of the air to be cooled is higher. The temperature of the cooling water supplied to the cooling unit 5 at the upper opening 101 of the oblique honeycomb is usually 7 to 10° C. The temperature of the cooling water at the upper opening 101 is lower than the temperature of the discharge water at the lower opening 104 of the oblique honeycomb disposed in the first row in the range of usually 2.5° C. or more, and preferably 5.0° C. or more. If the device is operated under these conditions, thermal efficiency is increased.

In the present invention, the liquid-gas ratio $L/G_{400\text{-}200}$ of the amount of cooling water to the amount of air to be cooled supplied per cooling unit is usually 0.1 to 0.5 kg/kg, and preferably 0.2 to 0.4 kg/kg. The liquid-gas ratio $L/G_{400\text{-}200}$ used herein refers to a weight ratio of the amount of water to the amount of air supplied per unit time in the case where the height and the thickness of one oblique honeycomb in the cooling unit are respectively 400 mm and 200 mm. The weight ratio $L/G$ of the amount of water to the amount of air supplied per unit time in the case where the height and the thickness of one oblique honeycomb in the cooling unit are respectively other than 400 mm and 200 mm is decreased from $L/G_{400\text{-}200}$ in inverse proportion to an increase in the height of one oblique honeycomb, and increased from $L/G_{400\text{-}200}$ in proportion to an increase in the thickness of one oblique honeycomb. For example, if the height and the thickness of one oblique honeycomb are respectively 800 mm and 200 mm, the $L/G$ of the oblique honeycomb is 0.15 when $L/G_{400\text{-}200}$ is 0.3. If the height and the thickness of one oblique honeycomb are respectively 400 mm and 600 mm, the $L/G$ of the oblique honeycomb is 0.9. In the present invention, the air can be sufficiently cooled even if the liquid-gas ratio is small such as in the above range due to high thermal efficiency.

In the case of using a plurality of cooling units, the number of cooling units is not limited to the above embodiment. The number of cooling units may be appropriately determined. For example, a necessary opening area (Ao) may be determined from fan power and space velocity of the air to be cooled which passes through the oblique honeycomb, and the number of cooling units may be determined so that Ao is satisfied. In this case, the space velocity of the air to be cooled is 1.5 to 3.0 m/sec., for example. The cooling water supply means and the water receiving section may be or may not be separately provided to each cooling unit. Specifically, a plurality of cooling units disposed in the widthwise direction may share the cooling water supply means or the water receiving section in each stage. For example, in the case where the cooling units are formed in two rows in the direction of the width of the front opening of the oblique honeycomb and in three stages in the direction of the height of the front opening, the cooling water supply means and the water receiving section in each stage may be shared by two rows of cooling units disposed in the widthwise direction. If the cooling water supply means and the like are shared in each stage in this manner, costs can be reduced.

The air cooling device according to the present invention can be used as an air cooling device used for office buildings, hospitals, and factories.

EXAMPLES

The present invention is described below in more detail by examples. However, these examples should not be construed as limiting the present invention.

Example 1

Glass nonwoven fabric formed by using E glass fiber and an organic binder was immersed in slurry containing alumina hydrate as a filler and alumina sol as a binder. The mixture was dried and corrugated to obtain corrugated products. The resulting corrugated products were alternately layered so that the directions in which the wave spread intersect, and heated at 500° C. to obtain an oblique honeycomb consisting of 80 wt % in total of alumina and an alumina sol cured product and 20 wt % of E glass fiber, and having a porosity of 65%, a wave height of 4.8 mm, and a pitch of 10 mm. The oblique honeycomb had a width of 1000 mm, a height of 400 mm, and a depth of 200 mm with respect to the direction in which air was allowed to pass through the oblique honeycomb. The angle at which the directions in which the waves of the corrugated sheets spread intersected in every other layer (symbol Y shown in FIG. 1) was 60 degrees. The oblique angle with respect to the inflow/outflow direction (horizontal direction) of air when viewed from the front and back sides of the cells extending in the oblique direction (symbol X shown in FIG. 1) was 30 degrees. The oblique honeycomb was incorporated into a case which was capable of holding the oblique honeycomb and through which air passed, through the front and rear sides and the upper and lower sides. A water supply pan, to which a nozzle for supplying cooling water to the honeycomb was attached, was installed at the top of the oblique honeycomb, and a discharge water pan for receiving the cooling water which passed through the honeycomb was installed at the bottom of the oblique honeycomb to obtain a cooling unit. The cooling unit had a height of 500 mm including the water supply pan and the discharge water pan, a width of 1000 mm, and a depth of 200 mm. The cooling units were incorporated into a case having a width of 1000 mm, a height of 1500 mm, and a depth of 200 mm, of which the front and back sides were opened, in three stages in the vertical direction (three-stage, one-row arrangement of cooling units, three units in total). The warmed cooling water received by the discharge water pan was transferred to a heat exchanger for cooling water through a water pump, cooled therein, and circulated to a water supply pan at the top of the honeycomb. The conditions of the cooling unit and the like are shown in Tables 1 and 2.

Air at a temperature of 32° C. and a humidity of 70 RH%, which are summer air conditions, was caused to pass through the device at a flow rate of 7200 m³/hour. Cold water at a temperature of 7° C. was supplied from a water supply section at a rate of 21 L/min. per unit (liquid-gas ratio L/G=0.29 kg/kg) (63 L/min. in total). The temperature and humidity of the outlet air and pressure drop of the air cooling device were measured. The results are shown in Table 3.

Reference Example 1

The temperature and humidity of the outlet air and pressure drop of the air cooling device were measured in the same manner as in Example 1 except for using a cooling unit with a width of 1000 mm, a height of 1300 mm, and a depth of 200 mm including an oblique honeycomb with a width of 1000 mm, a height of 1200 mm, and a thickness of 200 mm, a water supply pan, and a discharge water pan was used (one-stage, one-row arrangement of cooling unit), and a case having the same shape and capable of placing the cooling unit. The conditions of the cooling unit and the like and the measurement results are shown in Tables 1 to 3. In this example, a carry over phenomenon, in which a considerable amount of cooling water was scattered by the wind downwind of the honeycomb, occurred during operation. It is considered that this phenomenon occurred because the amount of cooling water in the direction of the depth of the oblique honeycomb was too great, since the $L/G_{400-200}$ was greater than that in Example 1 although the L/G was the same as in Example 1.

Comparative Example 1

The temperature and humidity of the outlet air and pressure drop of the air cooling device were measured in the same manner as in Example 1 except for using a fin coil-type heat exchanger (manufactured by Sakaigawa Kogyo Industry) under conditions shown in Table 2 instead of the air cooling device used in Example 1. The conditions of the fin coil-type heat exchanger and the like and the measurement results are shown in Tables 1 to 3.

Example 2

The temperature and humidity of the outlet air and pressure drop of the air cooling device were measured in the same manner as in Example 1 except for changing the wave height and the pitch of the oblique honeycomb to 3.5 mm and 7.5 mm, respectively. The conditions of the cooling unit and the like and the measurement results are shown in Tables 1 to 3.

Example 3

The temperature and humidity of the outlet air and pressure drop of the air cooling device were measured in the same manner as in Example 1 except for incorporating the cooling units obtained in Example 1 into a case having a width of 1000 mm, a height of 1500 mm, and a depth of 600 mm of which the front and back sides were opened, in three stages in the vertical direction and in three rows in the front and back direction (three-stage, three-row arrangement of cooling units, nine units in total). The measurement conditions were as shown in Tables 3 and 4. Because this example was assumed to cool an air inlet port for a clean room of a semiconductor factory, the content of impurity ions in air at the air inlet port and the removal rate of impurity ions in air after cooling were also measured. The impurity ion concentration was determined by collecting air at the air inlet port and air after cooling by using an impinger in which ultrapure water was placed, and analyzing the collected solutions by ion chromatography. The conditions of the cooling unit and the like and the measurement results are shown in Tables 1 to 4.

TABLE 1

| | Example 1 | Reference Example 1 | Comparative Example 1 | Example 2 | Example 3 |
|---|---|---|---|---|---|
| Heat exchange means in air cooling device | Oblique honeycomb | Oblique honeycomb | Fin coil | Oblique honeycomb | Oblique honeycomb |
| Size of honeycomb cell | | | | | |
| Wave height (mm) | 4.8 | 4.8 | — | 3.5 | 4.8 |
| Pitch (mm) | 10 | 10 | — | 7.5 | 10 |
| Size of one oblique honeycomb | | | | | |
| Width (mm) | 1000 | 1000 | — | 1000 | 1000 |
| Height (mm) | 400 | 1200 | — | 400 | 400 |
| Depth (mm) | 200 | 200 | — | 150 | 200 |

TABLE 2

| | Example 1 | Reference Example 1 | Comparative Example 1 | Example 2 | Example 3 |
|---|---|---|---|---|---|
| Size of one cooling unit or fin coil | | | | | |
| Width (mm) | 1000 | 1000 | 1000 | 1000 | 1000 |
| Height (mm) | 500 | 1300 | 1500 | 500 | 500 |
| Depth (mm) | 200 | 200 | 600 | 150 | 200 |
| Arrangement of cooling unit or fin coil | Three stages, one row | One stage, one row | one unit | Three stages, one row | Three stages, three rows |
| Size of entire cooling unit or fin coil | | | | | |
| Width (mm) | 1000 | 1000 | 1000 | 1000 | 1000 |
| Height (mm) | 1500 | 1300 | 1500 | 1500 | 1500 |
| Depth (mm) | 200 | 200 | 600 | 150 | 600 |
| Heating area ($m^2$) | 150 | 150 | 175 | 155 | 450 |

TABLE 3

| | Example 1 | Reference Example 1 | Comparative Example 1 | Example 2 | Example 3 |
|---|---|---|---|---|---|
| Cooling water | | | | | |
| Inlet temperature (° C.) | 7 | 7 | 7 | 7 | 7 |
| Outlet temperature of cooling unit in first row or fin coil (° C.) | 16 | 22 | 12 | 16 | 16 |
| Outlet temperature of cooling unit in third row (° C.) | — | — | 50 | — | 11.5 |
| Amount of water supply per oblique honeycomb (L/min) | 21 | 63 | — | 16 | 21 |
| Amount of water supply in entire cooling device (L/min.) | 63 | 63 | 338 | 48 | 189 |
| Inlet air | | | | | |
| Temperature (° C.) | 32 | 32 | 32 | 32 | 32 |
| Humidity (RH %) | 70 | 70 | 70 | 70 | 70 |
| Outlet air | | | | | |
| Temperature (° C.) | 19 | 26 | 19 | 19 | 10.5 |
| Humidity (RH %) | 100 | 100 | 100 | 100 | 100 |
| Amount of air supply ($m^3$/hour) | 10800 | 10800 | 10800 | 10800 | 10800 |
| Liquid-gas ratio $L/G_{400-200}$ (kg/kg) | 0.29 | 0.87 | — | 0.29 | 0.87 |
| Liquid-gas ratio $L/G$ (kg/kg) | 0.29 | 0.29 | 1.58*[1] | 0.22 | 0.29 |
| Pressure drop (Pa) | 50 | 60 | 84 | 55 | 150 |
| Carry over | None | Occurred | None | None | None |

*[1] Value obtained by dividing weight of water supply to fin coil by weight of air supply

TABLE 4

| | Example 3 |
|---|---|
| Ion concentration in inlet air | |
| $NH_4^+$ (ppb) | 10.1 |
| $SO_4^{2-}$ (ppb) | 9.5 |
| $NO_2^-$ (ppb) | 10.5 |
| Ion concentration in outlet air | |
| $NH_4^+$ (ppb) | 0.3 |
| $SO_4^{2-}$ (ppb) | 0.2 |
| $NO_2^-$ (ppb) | 0.5 |
| Removal rate | |
| $NH_4^+$ (%) | 97 |
| $SO_4^{2-}$ (%) | 97 |
| $NO_2^-$ (%) | 95 |

The following results are obtained from Tables 1 to 4. In Reference Example 1, the temperature of the outlet air was increased in the same amount of water as in Example 1. In Comparative Example 1, a greater amount of cooling water was necessary due to a large pressure drop. Moreover, the depth of the space for installing the fin coil was three times that in Example 1 although the cooling performance was equal. In Example 2, the depth of the installation space was decreased in comparison with Example 1 by decreasing the size of the honeycomb cells. Moreover, the amount of cooling water was decreased. In Example 3, the cooled air at a temperature of 10.5° C. and a humidity of 100 RH%, which conformed to air conditions in a clean room (23° C., 45 RH%), was obtained as the outlet air by heating. Moreover, it was found that 90% or more of $NH_4^+$, $SO_4^{2-}$, and $NO_2^-$ were removed.

INDUSTRIAL APPLICABILITY

Circulating air or intake air in office buildings or factories can be cooled by using the air cooling device of the present invention using a simple configuration of the oblique honeycomb, while ensuring high thermal efficiency, a small liquid-gas ratio, and a small pressure drop, saving space and energy, and reducing cost.

What is claimed is:

1. An air cooling device, comprising:

at least one cooling unit that comprises an oblique honeycomb that has front, rear, upper, and lower openings and is disposed so that air to be cooled is introduced into the front opening and cooled air is discharged from the rear opening;

a cooling water supply means for supplying cooling water to the upper opening of the oblique honeycomb;

a water receiving section configured to receive water discharged from the lower opening of the oblique honeycomb; and a blower means for introducing the air to be cooled into the front opening of the oblique honeycomb and allows the cooled air to be discharged from the rear opening of the oblique honeycomb, wherein the height of the oblique honeycomb in each cooling unit is 200 mm to 800 mm.

2. The air cooling device according to claim 1, further comprising:

a cooling means for cooling the discharged water; and a water circulating means for supplying the discharged water to the cooling water supply means.

3. The air cooling device according to claim 1, wherein the at least one cooling unit comprises a plurality of cooling units disposed in a vertical direction.

4. The air cooling device according to claim 1, wherein the at least one cooling unit comprises a plurality of cooling units disposed in a direction in which the air to be cooled flows.

5. The air cooling device according to claim 1, wherein the at least one cooling unit comprise a plurality of cooling units disposed in a widthwise direction.

6. The air cooling device according to claim 5, wherein the plurality of cooling units disposed in the widthwise direction share the cooling water supply means or the water receiving section in each stage.

7. The air cooling device according to claim 1, wherein a sheet-shaped member which makes up the oblique honeycomb comprises one or more fillers and/or binders selected from the group consisting of alumina, silica, and titania, and a fiber substrate such as glass fiber, ceramic fiber, or alumina fiber.

8. The air cooling device according to claim 1, wherein the oblique honeycomb has a porosity of 50% to 80%.

9. The air cooling device according to claim 1, wherein the oblique honeycomb has a wave height of 2.5 mm to 8.0 mm.

10. An air cooling method using an air cooling device that includes at least one cooling unit that comprises an oblique honeycomb that has front, rear, upper, and lower openings and is disposed so that air to be cooled is introduced into the front opening and cooled air is discharged from the rear opening; a cooling water supply means which supplies cooling water to the upper opening of the oblique honeycomb; and a water receiving section which receives water discharged from the lower opening of the oblique honeycomb, wherein the height of the oblique honeycomb in each cooling unit is 200 mm to 800 mm the method comprising:

introducing air to be cooled into the front opening of the oblique honeycomb of the cooling unit; and allowing cooled air to be discharged from the rear opening of the oblique honeycomb.

11. The air cooling method according to claim 10, wherein the air cooling device further comprises a cooling means for cooling the discharged water; and a water circulating means for supplying the discharged water to the cooling water supply means.

12. The air cooling method according to claim 10, wherein the at least one cooling unit comprises a plurality of cooling units disposed in a vertical direction.

13. The air cooling method according to claim 10, wherein the at least one cooling unit comprises a plurality of cooling units disposed in a direction in which the air to be cooled flows.

14. The air cooling method according to claim 10, wherein the at least one cooling unit comprises a plurality of cooling units disposed in a widthwise direction.

15. The air cooling method according to claim 10, wherein the plurality of the cooling units disposed in the widthwise direction share the cooling water supply means and/or the water receiving section in each stage.

16. The air cooling method according to claim 10, wherein a sheet-shaped member which makes up the oblique honeycomb comprises one or more fillers and/or binders selected from the group consisting of alumina, silica, and titania, and a fiber substrate such as glass fiber, ceramic fiber, or alumina fiber.

17. The air cooling method according to claim 10, wherein the oblique honeycomb has a porosity of 50% to 80%.

18. The air cooling method according to claim 10, wherein the oblique honeycomb has a wave height of 2.5 mm to 8.0 mm.

19. The air cooling method according to claim 10, wherein the temperature of the cooling water at the upper opening of the oblique honeycomb disposed in a first row is lower than the temperature of the discharge water at the lower opening of the oblique honeycomb in the range of 2.5° C. or more.

20. The air cooling method according to claim 10, wherein a liquid-gas ratio $L/G_{400-200}$ of the amount of cooling water to the amount of air to be cooled supplied per cooling unit is 0.1 to 0.5 kg/kg.

* * * * *